No. 768,014.

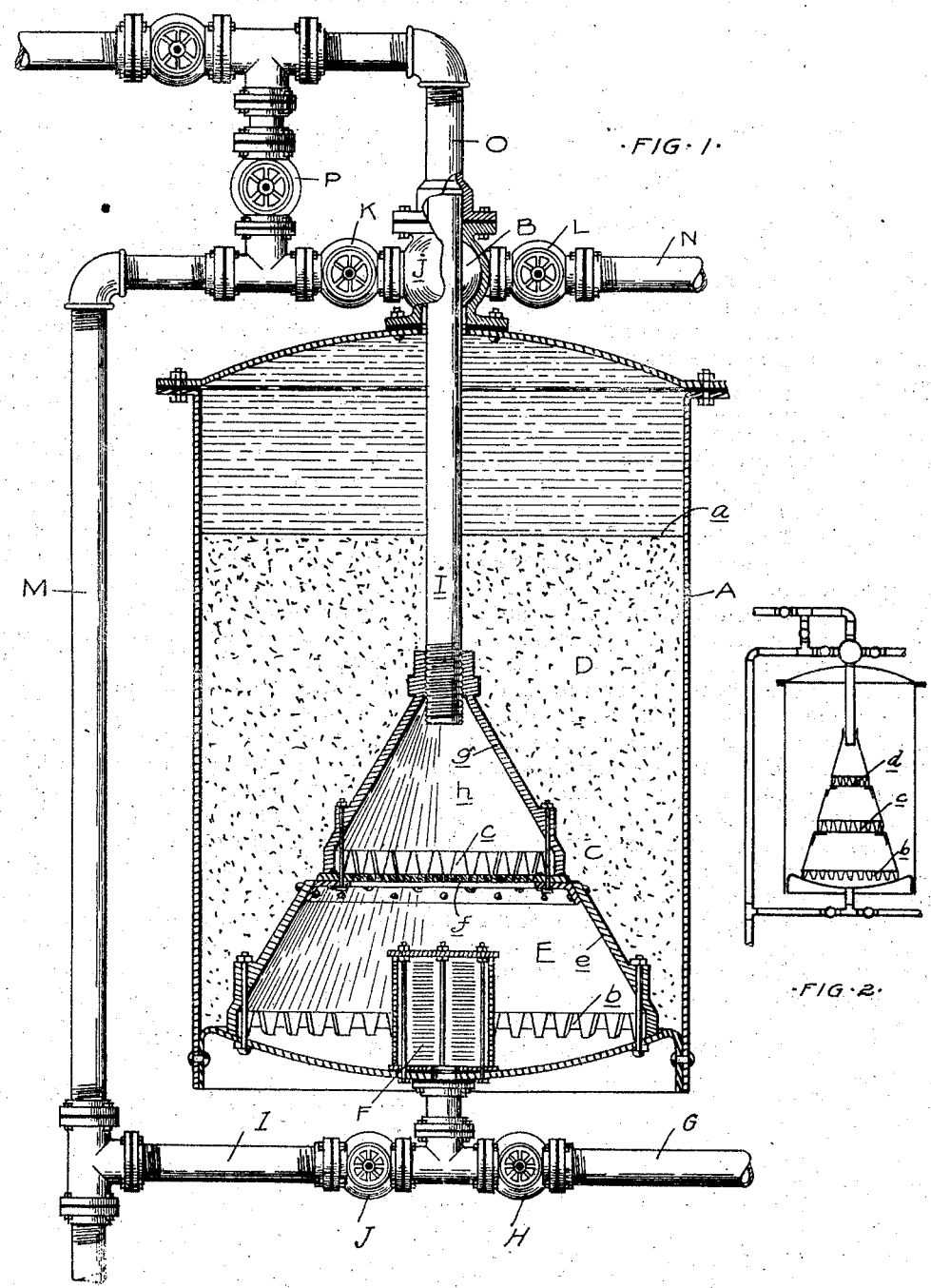

Patented August 16, 1904.

UNITED STATES PATENT OFFICE.

HARRY MARSH, OF DETROIT, MICHIGAN, ASSIGNOR TO THE HYGEIA FILTER COMPANY, OF DETROIT, MICHIGAN, A CORPORATION OF MICHIGAN.

FILTER.

SPECIFICATION forming part of Letters Patent No. 768,014, dated August 16, 1904.

Application filed October 5, 1903. Serial No. 175,870. (No model.)

*To all whom it may concern:*

Be it known that I, HARRY MARSH, a citizen of the United States, residing at Detroit, in the county of Wayne and State of Michigan, have invented certain new and useful Improvements in Filters, of which the following is a specification, reference being had therein to the accompanying drawings.

The invention relates to filters of that type in which the filtration is effected by a bed of granular material arranged within a closed casing. With filters of this type it is necessary to periodically agitate the filter-bed by a reversal of the water-current therethrough, so as to cleanse the bed from the collected impurities. This agitation of the bed has heretofore been effected in various ways; but in order to produce thorough results it is necessary that the currents of water for agitating the bed should have considerable force, and this is difficult to accomplish where the bed is of considerable size and the water connection of limited capacity. One method by which the agitation of the bed has heretofore been accomplished is by forming a conical bottom to the casing containing the filter-bed and providing jet-openings in the base of the cone, through which the water is passed during the reversal of the current. This method is effective in quickly cleansing the bed immediately adjacent to the base of the cone; but the central portion of the bed is not as soon affected by the agitation, and therefore is only thoroughly cleansed when the operation is continued for some time.

It is the object of the present invention to obtain a construction in which the filter-bed is uniformly agitated throughout its extent, so that all portions thereof will be quickly and thoroughly cleansed.

In the drawings, Figure 1 is a vertical longitudinal section through the filter, together with the water connections thereto. Fig. 2 is a similar view illustrating a modified construction.

A is a casing preferably of cylindrical shape, having its axis arranged vertically.

B is a water-inlet conduit, which is connected to the upper end of the casing A.

C is a conical bottom for the casing, and D is the filter-bed supported upon said bottom and extending upward to suitable height, such as indicated by the line $a$. The conical bottom C is hollow to form a chamber E therein, and at the base of the cone a series of apertures $b$ is formed therein through which the filtered water from the bed passes into the chamber E.

F is a metallic filter or screen arranged within the chamber E, and G is an outlet-conduit connected with the interior of the screen F. This conduit has the controlling-valve H therein, and between said valve and the screen is connected the water-supply pipe I, which is controlled by the valve J.

With the construction as thus far described whenever it is desired to cleanse the bed the valve K in the main supply-pipe M is closed, the valve H in the outlet-pipe G is closed, the valve L in the waste-pipe N is opened, and the valve J in the pipe I is opened. With the valves in this position the water will flow through the supply-pipe M, pipe I, screen F, chamber E, apertures $b$ in the base of the cone, filter-bed B, and out through the waste-pipe N. As has been before stated, this agitation of the bed is insufficient to quickly and thoroughly cleanse it. I therefore provide the conical base C with an additional series of jet-openings $c$, similar to the apertures $b$ in the construction shown in Fig. 1. The jet-openings $c$ are arranged in a plane above the base about one-half the altitude of the cone. In Fig. 2 two additional series of apertures $c'$ and $d$ are arranged in the cone. Through these apertures the water of the reverse current is directed into the filter-bed, with the result that it is agitated in the central portion as well as at the outer edge.

Instead of supplying the water for the different series of apertures in the cone from the single chamber E, I preferably divide the space within the cone into several chambers. This is accomplished in the construction shown in Fig. 1 by first forming a truncated cone $e$, having a solid diaphragm $f$ at its upper end, which forms the cover or top of the chamber A. Above this truncated cone $e$ is arranged a second cone $g$, which may be similar in construction to cone $e$ and has the apertures $c$ formed in its walls near the base. The chamber $h$ within the second cone is preferably connected with a vertically-extending conduit $i$, which passes through the fitting $j$, forming the connection of the conduit B with the casing A. The upper end of the conduit $i$ is connected with a conduit O, controlled by a valve P, and forming a by-pass through which the water from the supply-conduit M may be admitted to the chamber $h$. Thus when the valves are adjusted to reverse the current in the lower chamber E the valve P may be opened to simultaneously admit water-current to the chamber $h$, which will pass through the series of apertures $c$ and agitate the central portion of the filter-bed.

In the construction shown in Fig. 2 the base of the topmost cone is perforated, so that the apertures $c$ in the cone immediately below said topmost cone can be supplied from the conduit $i$.

By reason of the fact that the chambers within the upper and the lower cones are separated and provided with separate valve-controlled water-supply connections a reverse current may be sent through either series of apertures independently of the other. This has the advantage, first, that the bed may be agitated either in its central portion or its outer portion, as needed, and, second, that by washing the different portions of the bed successively a greater volume and pressure of water may be obtained, which will effect a greater agitation.

What I claim as my invention is—

1. In a filter the combination with a casing and a filter-bed contained therein, of a conical base for supporting said bed, said conical base being divided into a plurality of independent chambers by a diaphragm arranged therein and having an annular series of apertures at the base of each chamber, and means for passing a reverse current through said apertures to agitate said bed.

2. In a filter the combination with a casing and a filter-bed contained therein, of a conical base for supporting said bed, said conical base being divided into a plurality of independent chambers by a diaphragm arranged therein and having an annular series of apertures at the base of each chamber, independent supply connections to the chambers, and means whereby a reverse current may be sent through either or both series of apertures to agitate the bed.

3. In a filter the combination with a casing and filter-bed therein, of a truncated cone, and a superposed cone forming a supporting-base for said bed, each of said cones being provided at its base with an annular series of apertures, a diaphragm separating the space within said cones into two chambers, independent supply connections to each of the chambers, and means whereby a reverse current may be sent through either or both series of apertures to agitate said bed.

4. In a filter, the combination with a casing and filter-bed therein, of a plurality of superposed truncated cones, and a superposed cone forming a base for said bed, the lowermost but one of said truncated cones being provided with a solid base and all of the cones thereabove being provided with perforated bases, a supply connection to the chamber within the topmost cone, a second supply connection to the chamber within the lowermost cone, and means for passing a reverse current through either or both of said supply connections.

5. In a filter, the combination with a casing and filter-bed therein, of a truncated cone, and a superposed cone forming a supporting-base for said bed, each of said cones being provided at its base with an annular series of apertures, a diaphragm separating the space within said cones, a strainer within the lower chamber connecting with the outlet for the filtered water, a supply connection to said strainer, for a reverse water-current, and a second supply connection to the chamber, within the upper cone, whereby a reverse current may be sent through either or both series of apertures to agitate the bed.

In testimony whereof I affix my signature in presence of two witnesses.

HARRY MARSH.

Witnesses:
  JAMES P. BARRY,
  H. C. SMITH.